US007932796B2

(12) United States Patent
Yamada et al.

(10) Patent No.: US 7,932,796 B2
(45) Date of Patent: Apr. 26, 2011

(54) SWITCH DEVICE

(75) Inventors: Tomio Yamada, Aichi (JP); Masahiko Miyata, Aichi (JP); Katsuhide Kumagai, Aichi (JP); Tatsumi Ide, Miyagi (JP); Yoshinori Ota, Miyagi (JP)

(73) Assignees: Kabushiki Kaisha Tokai Rika Denki Seisakusho, Aichi (JP); NEC Tokin Corporation, Miyagi (JP)

( * ) Notice: Subject to any disclaimer, the term of this patent is extended or adjusted under 35 U.S.C. 154(b) by 390 days.

(21) Appl. No.: 12/244,282

(22) Filed: Oct. 2, 2008

(65) Prior Publication Data

US 2009/0091408 A1 Apr. 9, 2009

(30) Foreign Application Priority Data

Oct. 3, 2007 (JP) ................................ P2007-259988

(51) Int. Cl.

*H01H 9/00* (2006.01)
*H01H 1/66* (2006.01)
*H01H 3/14* (2006.01)
*H01F 7/02* (2006.01)
*G01B 7/14* (2006.01)

(52) U.S. Cl. ........ 335/205; 335/153; 335/206; 335/207; 335/229; 335/296; 335/302; 324/207.11; 324/207.26; 200/61.89

(58) Field of Classification Search .................. 335/153, 335/205–207, 229, 296, 302; 338/32 R, 338/32 H; 324/207.11, 207.26; 200/61.89–61.9
See application file for complete search history.

(56) References Cited

U.S. PATENT DOCUMENTS

| | | | | |
|---|---|---|---|---|
| 2,521,723 | A * | 9/1950 | Hubbell | 335/207 |
| 3,051,805 | A * | 8/1962 | Binford | 335/48 |
| 3,184,563 | A * | 5/1965 | Myatt | 335/153 |
| 3,264,424 | A * | 8/1966 | Baermann | 335/207 |
| 3,283,274 | A * | 11/1966 | De Falco | 335/206 |
| 3,284,743 | A * | 11/1966 | Spewock et al. | 335/205 |
| 3,443,043 | A * | 5/1969 | Heinz et al. | 335/205 |
| 3,691,490 | A | 9/1972 | Ragni | 335/205 |
| 3,707,627 | A * | 12/1972 | Sheppard | 246/192 R |
| 4,150,350 | A * | 4/1979 | Fong | 335/205 |
| 4,596,971 | A * | 6/1986 | Hirabayashi et al. | 335/205 |
| 2006/0244559 | A1 | 11/2006 | Hamm | 335/202 |
| 2009/0072936 | A1 * | 3/2009 | Yamada et al. | 335/207 |

FOREIGN PATENT DOCUMENTS

| | | |
|---|---|---|
| DE | 41 19 316 | 10/1992 |
| DE | 10 2004 004 016 | 8/2004 |
| FR | 1114385 | 4/1956 |
| FR | 2 848 936 | 6/2004 |
| JP | 2005-235632 | 9/2005 |
| WO | WO 2007119169 A1 * | 10/2007 |

* cited by examiner

*Primary Examiner* — Jeffrey Donels
*Assistant Examiner* — Mohamad A Musleh
(74) *Attorney, Agent, or Firm* — Morgan, Lewis & Bockius LLP

(57) ABSTRACT

A movable contact which is positioned inside a sealing case is moved by a magnetic shunt body which moves outside the sealing case. The movement of the movable contact by the movement of the magnetic shunt body is caused by a change of magnetic force of a magnet through a pair of yokes. The magnetic shunt body is assembled to a moving member, and elastically moves around the moving member resisting a first spring.

2 Claims, 2 Drawing Sheets

SWITCH DEVICE

BACKGROUND OF THE INVENTION

The present invention relates to a switch device in which a structure for operating contacts has been improved.

Generally, as a switch device, there has been provided such a structure that a stationary contact, a movable contact, and a spring for urging the movable contact to be contacted with or separated from the stationary contact are contained in a case, and a rod-like moving member is provided on the case so as to pass it through, wherein the movable contact is moved to be contacted with or separated from the stationary contact, by operating the moving member (Reference should be made to Japanese Patent Publication No. JP-A-2005-235632, for example).

The switch device having the above described structure is used, for example, as a stop lamp switch for a vehicle. In vicinity of the stop lamp switch for the vehicle, there are present lubricating oil applied to various mechanisms, organic and inorganic substances contained in components, and so on. In the conventional switch device as described above, there has been such anxiety that the lubricating oil and foreign bodies of the organic and inorganic substances may intrude into the case through a region where the moving member is passed and stick between the movable contact and the stationary contact, incurring a problem of bad continuity between the contacts, particularly due to a silicone component.

SUMMARY OF THE INVENTION

The invention has been made in view of the above described circumstances, and it is an object of the invention to provide such a switch device that a stationary contact and a movable contact can be contacted with and separated from each other, in a state where foreign bodies such as lubricating oil will not intrude into a case which contains the stationary contact and the movable contact, and the contact between both the contacts can be performed more rapidly, whereby switching performance can be enhanced, and that these features can be realized with a compact structure.

In order to attain the above described object, there is provided, according to the invention, a switch device comprising a stationary contact, a movable contact corresponding to the stationary contact and having magnetic property, a sealing case which contains the stationary contact and the movable contact, a yoke corresponding to the movable contact and having magnetic property, a magnet which exerts a magnetic force on the yoke thereby to attract the movable contact through the yoke, a moving member positioned outside the sealing case and adapted to be operated to move, a magnetic shunt body which is assembled to the moving member so as to move in a moving direction of the moving member, a first spring which urges the magnetic shunt body in the moving direction toward the yoke, a holder for retaining the magnetic shunt body against an urging force of the first spring, and a second spring which urges the holder and the moving member in a direction away from the yoke with a stronger urging force than the first spring, characterized in that when the moving member is moved against the urging force of the second spring, a distance between the magnetic shunt body and the yoke is changed, whereby the force for attracting the movable contact by the magnet through the yoke is changed, and the movable contact is moved with respect to the stationary contact.

According to the above described means, the movable contact positioned inside the sealing case can be moved with respect to the stationary contact by the movement of the magnetic shunt body which moves outside the sealing case. Accordingly, the contact and separation between the movable contact and the stationary contact which are contained in the sealing case can be performed in such a manner that lubricating oil, foreign bodies such as organic and inorganic substances existing in vicinity of the sealing case may not intrude into the sealing case. In this manner, anxiety of bad continuity between the contacts due to intruded bodies which has occurred in the past can be eliminated.

Moreover, the movement of the movable contact (contact and separation with respect to the stationary contact) by the movement of the above described magnetic shunt body is caused by a change of the magnetic force of the magnet which is exerted on the movable contact through a pair of the yokes, and the change is made abruptly. In this manner, the movable contact and the stationary contact can be more rapidly contacted with and separated from each other, and hence, switching performance can be enhanced.

Additionally, because the magnetic shunt body is assembled to the moving member and moves around the moving member, an entirety of the switch device can be made compact in a moving direction of the moving member, as compared with a case where the magnetic shunt body is positioned at the side of the yokes rather than at the side of the moving member.

DETAILED DESCRIPTION OF PREFERRED EMBODIMENTS

Figure 1:
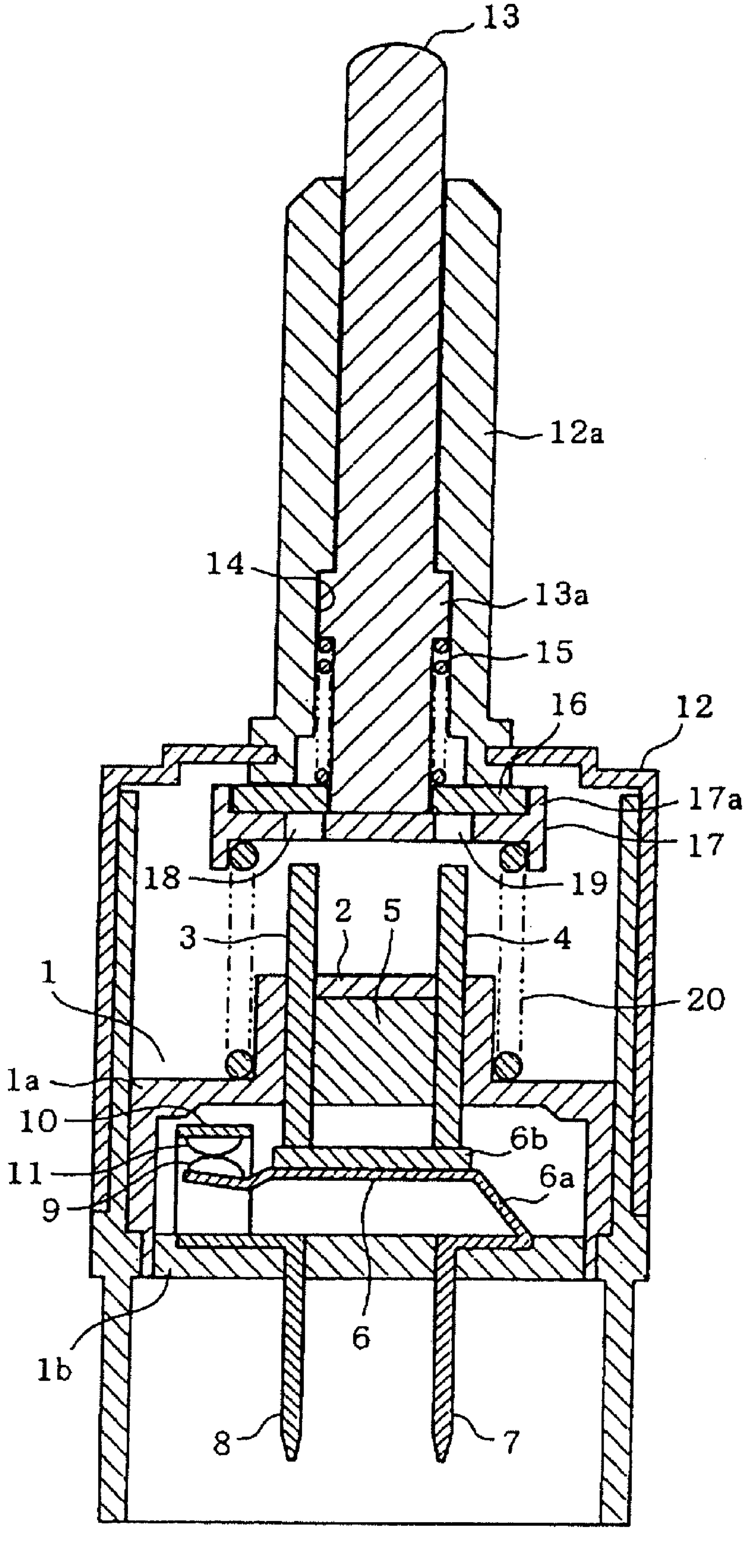
FIG. 1 is a vertical sectional view of a switch device in an embodiment according to the invention.

Now, an embodiment of the invention (a mode for carrying out the invention) will be described referring to the drawings.

To begin with, FIG. 1 is a vertical sectional view showing an entire structure of a stop lamp switch for a vehicle which includes a sealing case 1 as a main member. This sealing case 1 includes a case main body 1*a* and a case bottom plate 1*b*. An upper face part of the case main body 1*a* has a swelled part 2 in a center part thereof, and the upper face part is closed, while a bottom part is open.

The swelled part 2 of the case main body 1*a* is provided with a pair of yokes 3, 4 so as to pass it through. These yokes 3, 4 are formed of magnetic material such as iron, in short material having magnetic property, and made integral with the case main body 1*a* by being inserted into the case main body 1*a*, for example, at a time of molding. Respective intermediate parts of the yokes 3, 4 are held on an upper wall of the swelled part 2 of the case main body 1*a* in tight contact, so that two upper and lower spaces partitioned by the case main body 1*a* may not have permeability. Respective upper parts of the yokes 3, 4 protrude into the upper space above the swelled part 2, which is an outside of the case main body 1*a*, and respective lower parts of the yokes 3, 4 protrude into the lower space below the upper wall of the case main body 1*a*, which is an inside of the case main body 1*a*.

Moreover, a magnet (permanent magnet) 5 is provided between the yokes 3 and 4, inside the swelled part 2 of the case main body 1*a*. This magnet 5 is also integrally provided with the case main body 1*a* by being inserted at a time of molding the case main body 1*a*. The magnet 5 is made integral in such a manner that un upper part of the magnet 5 is positioned inside the swelled part 2 of the case main body 1*a* having both side faces thereof contacted with the yokes 3, 4, while a lower face of the magnet 5 is exposed to the inside of the case main body 1*a*.

The yokes 3, 4 are arranged in parallel in the drawing, and a movable contact 6 is disposed directly below the yokes 3, 4. In this embodiment, the movable contact 6 includes a contact main plate 6*a* formed of electrically conductive material such as phosphor bronze which is nonmagnetic material, and a magnetic plate 6*b* formed of magnetic material such as iron which is fixed to an upper face of the contact main plate 6*a*. The movable contact 6 has magnetic property because of this magnetic plate 6*b*.

The contact main plate 6*a* is integrally formed with a connecting terminal 7, for example, and the connecting terminal 7 is provided so as to pass through the case bottom plate 1*b* together with a connecting terminal 8. Specifically, the connecting terminals 7, 8 too are made integral with the case main body 1*a* by being inserted at a time of molding the case bottom plate 1*b*. The connecting terminals 7, 8 are made integral in such a manner that respective upper parts of the connecting terminals 7, 8 are held by the case bottom plate 1*b* in tight contact so that two upper and lower spaces partitioned by the case bottom plate 1*b* may not have permeability. Respective lower parts of the connecting terminals 7, 8 protrude into the lower space below the case bottom plate 1*b*.

On occasion of integrally providing the connecting terminals 7, 8 with the case bottom plate 1*b*, it is also possible to employ such a structure that holes are made in the case bottom plate 1*b*, and after the connecting terminals 7, 8 have been passed through the holes, gaps between the connecting terminals 7, 8 and the holes are filled with a sealing agent for tight sealing. This structure can be also applied to a part where the yokes 3, 4 are integrally provided on the case main body 1*a*, as described above. Specifically, it is also possible to employ such a structure that holes are made in the case main body 1*a*, and after the yokes 3, 4 have been passed through the holes, gaps between the yokes 3, 4 and the holes are filled with a sealing agent for tight sealing.

Figure 2:
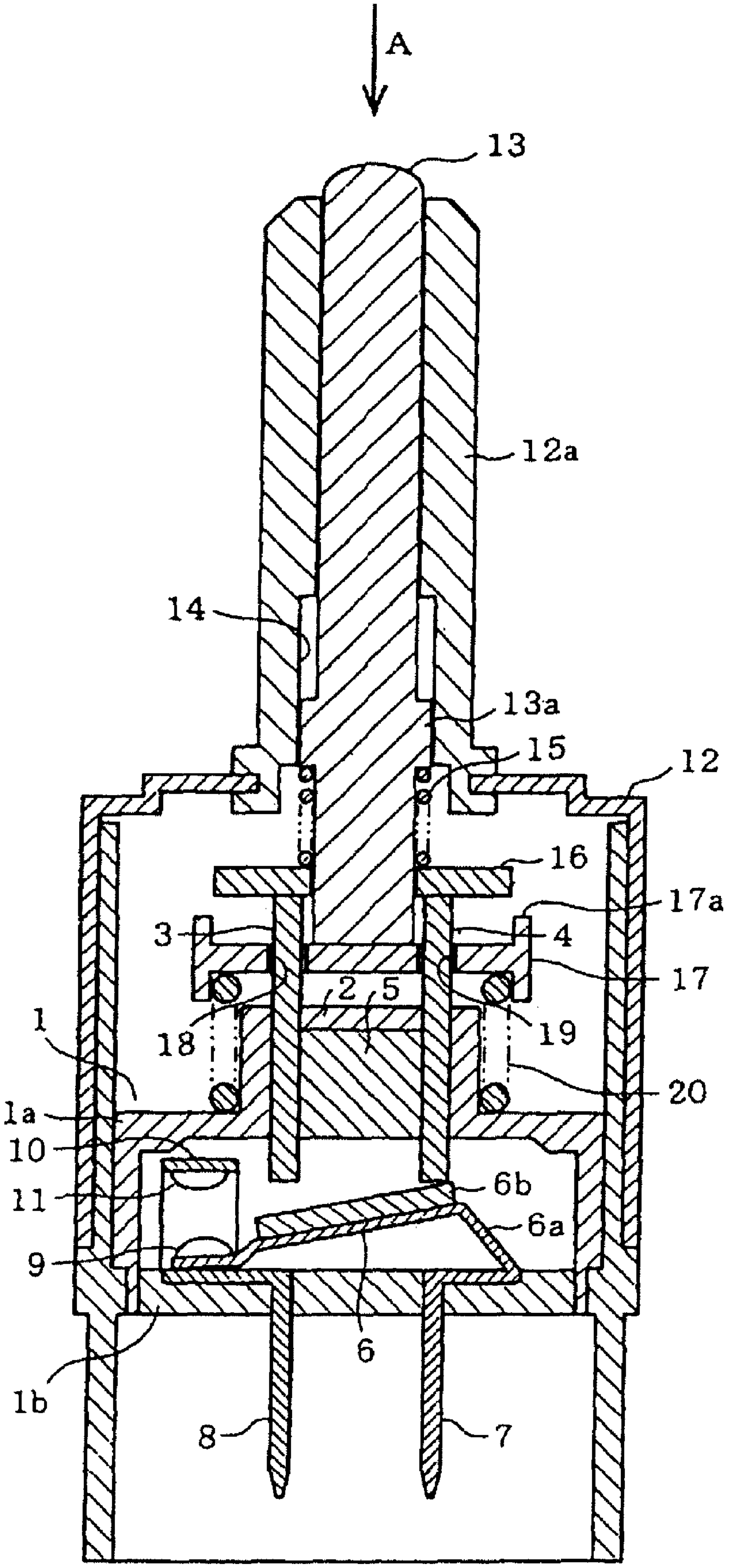
FIG. 2 is a vertical sectional view of the switch device in a different state from FIG. 1.

The contact main plate 6*a* of the movable contact 6 extends from the upper part of the connecting terminal 7 diagonally upward to a left side in the drawing, and further extends therefrom diagonally downward to the left side, in a normal state, as shown in FIG. 2. The case bottom plate 1*b* is joined to the bottom part of the case main body 1*a*, to tightly close an open area of the bottom part. In this state, a right end part of the magnetic plate 6*b* of the movable contact 6 is in contact with a lower end part of the yoke 4 at the right side, at a top of the contact main plate 6*a* which is upwardly extended from the upper part of the aforesaid connecting terminal 7.

Therefore, a part of the movable contact 6 extending diagonally downward to the left side in FIG. 2 is initially positioned below and remote from the yoke 3 at the left side. However, in a state as shown in FIG. 1 in which a magnetic force of the magnet 5 is exerted on only the movable contact 6 (the magnetic plate 6*b*) through the yokes 3, 4, the part diagonally extending to the left side of the movable contact 6 is attracted by the magnet 5 through the yokes 3, 4 to be elastically deformed into a substantially horizontal position.

In addition, a distal end part (left end part) of the contact main plate 6*a* is provided with a contact 9 on an upper face side thereof. On the other hand, a contact 11 of the stationary contact 10 is provided above the contact 9 so as to be opposed to the contact 9. In the state where the movable contact 6 is attracted by the magnet 5 and elastically deformed into the substantially horizontal position as described above, the contact 9 of the movable contact 6 is in contact with the contact 11 of the stationary contact 10. The stationary contact 10 is integrally formed with the aforesaid connecting terminal 8.

The case bottom plate 1*b* is joined to the bottom part of the case main body 1*a* as described above, thereby to form the aforesaid sealing case 1. At the same time, the stationary contact 10, the magnet 5, and the lower parts of the yokes 3, 4 are contained inside the sealing case 1.

The connecting terminals 7, 8 which extend downward from the case bottom plate 1*b* are surrounded by a cylindrical part 1*c* which is integrally formed with the case bottom plate 1*b*, and adapted to be connected to conductive wires (not shown) by way of a connector (not shown) which is adapted to be inserted into the cylindrical part.

A cover 12 is attached to the outside of the sealing case 1 (the case main body 1*a*). This cover 12 has a guide tube 12*a* at a center of its upper part, and a rod-like moving member 13 is passed through this guide tube 12*a* so as to move in a vertical direction in the drawings. The moving member 13 has a large diameter part 13*a* at an intermediate position close to its lower part, and this large diameter part 13*a* is inserted into a large diameter hole 14 which is formed in a lower part of the guide tube 12*a*.

Moreover, a first spring 15 is wound around a part of the moving member 13 lower than the large diameter part 13*a*, and this first spring 15, which is a compression spring, is also contained in the large diameter hole 14 of the aforesaid guide tube 12*a*. In addition, a magnetic shunt body 16 is assembled to a lower end part of the moving member 13. This magnetic shunt body 16 is formed of magnetic material such as iron. In this embodiment, the magnetic shunt body 16 is formed in a shape of a ring which surrounds the moving member 13, and has a larger outer diameter than a lower end part of the guide tube 12*a*.

Further, a holder 17 is disposed just below the magnetic shunt body 16. This holder 17 has a larger outer diameter than the magnetic shunt body 16, and a rim 17*a* projecting both upward and downward is provided on an outer circumference of the holder 17. Holes 18, 19 are formed in the holder 17 at positions close to its center so as to correspond to the yokes 3, 4.

A second spring 20 is interposed between a lower face of the holder 17 and the case main body 1*a* of the aforesaid sealing case 1. This second spring 20 is a compression spring which surrounds the swelled part 2 of the case main body 1*a*, and pushes up the moving member 13 and the magnetic shunt body 16 apart from the holder 17 with a stronger urging force than the first spring 15. In short, the moving member 13 and the magnetic shunt body 16 are urged apart from the holder 17 in a direction away from the yokes 3, 4. As the results, the holder 17 moves the magnetic shunt body 16 upward to be separated from the upper end parts of the yokes 3, 4 and to be pressed to the lower end of the moving member 13. At the same time, the holder 17 surrounds the magnetic shunt body 16 with a part of the rim 17*a* which is projected upward.

Further, the moving member 13 is pushed upward until the large diameter part 13*a* is restrained by a deep end of the large diameter part 14 of the guide tube 12*a*, and an upper part of the moving member 13 is projected upward from the guide tube 12*a* so as to correspond to a brake pedal of a vehicle which is not shown.

On the other hand, the first spring 15 presses the magnetic shunt body 16 onto the holder 17, that is, urges the magnetic shunt body 16 in a direction of moving toward the yokes 3, 4, and thus, the magnetic shunt body 16 is kept and retained at a position as shown in FIG. 1.

Then, operation of the above described switch device will be described.

A stop lamp switch for the vehicle is kept at the position as shown in FIG. 1, before the brake pedal of the vehicle is operated by foot. Specifically, as described above, the moving member 13 and the magnetic shunt body 16 are pushed up by the second spring 20 apart from the holder 17, and the magnetic shunt body 16 is retained at the position upwardly separated from the upper end parts of the yokes 3, 4, while the upper part of the moving member 13 is projected upward from the guide tube 12*a*.

As the results, the movable contact 6 is attracted by the magnet 5 through the yokes 3, 4, since the magnetic force of the magnet 5 is exerted on only the movable contact 6 through the yokes 3, 4, to be elastically deformed into the substantially horizontal position, whereby its contact 9 is kept in contact with the contact 11 of the stationary contact 10. Therefore, on this occasion, the connecting terminals 7 and 8 are electrically continued to each other by way of an electric passage between the movable contact 6 and the stationary contact 10.

When the brake pedal of the vehicle is pressed to be operated from this state, as shown by an arrow mark A in FIG. 2, the moving member 13 moves toward the sealing case 1 in correspondence with this action, while compressing the second spring 20 by way of the holder 17. Accordingly, the holder 17 and the magnetic shunt body 16 also move toward the sealing case 1 (at the side of the yokes 3, 4), allowing the yokes 3, 4 to be inserted into the holes 18, 19 of the holder 17. Consequently, the magnetic shunt body 16 comes into contact with the upper end parts of the yokes 3, 4. Such contacts between the magnetic shunt body 16 and the upper end parts of the yokes 3, 4 are performed, while the first spring 15 is compressed, and therefore, elastically performed.

When the magnetic shunt body 16 has come into contact with the upper end parts of the yokes 3, 4 in this manner, the magnetic force of the magnet 5 is exerted not only on the movable contact 6 through the yokes 3, 4 but also on the magnetic shunt body 16 through the yokes 3, 4. Therefore, the magnetic force exerted on the movable contact 6 is changed (weakened, in this case), and a force for attracting the movable contact 6 is changed (weakened, in this case). Consequently, a restoring force of the movable contact 6 from the elastically deformed state becomes larger than the attractive force of the magnet 5 to be exerted on the movable contact 6, whereby the movable contact 6 is restored, allowing the contact 9 to be separated from the contact 11 of the stationary contact 10, and the electric passage between the connecting terminals 7, 8 is interrupted. In this manner, the stop lamp switch for the vehicle is associated with the pressing operation of the brake pedal of the vehicle, and hence, the stop lamp of the vehicle which is not shown will be lit.

When the pressing operation of the brake pedal of the vehicle is released, the entire structure is restored to the original state, and the movable contact 6 is attracted by the magnet 5 to bring the contact 9 into contact with the contact 11 of the stationary contact 10, whereby the stop lamp of the vehicle will be shut off.

As described above, according to the structure, the magnetic attractive force of the magnet 5 which is exerted on the movable contact 6 inside the sealing case 1 through the yokes 3, 4 is changed by the movement of the magnetic shunt body 16 due to the movement of the moving member 13 outside the sealing case 1. Accordingly, the movable contact 6 can be moved with respect to the stationary contact 10, without entering into the sealing case 1. Therefore, the movable contact 6 and the stationary contact 10 which are contained in the sealing case 1 can be contacted with and separated from each other in a state where the lubricating oil, the foreign bodies of organic and inorganic substances existing in vicinity of the sealing case 1 will not intrude into the sealing case 1. In this manner, anxiety of bad continuity between the contacts 6 and 10 due to intruded bodies which has occurred in the past can be eliminated.

Moreover, the magnetic attractive force of the magnet 5 which is exerted on the movable contact 6 inside the sealing case 1 through the yokes 3, 4 can be changed abruptly, as compared with a case of moving the magnet 5 itself. As the results, the movable contact 6 and the stationary contact 10 can be more rapidly contacted with and separated from each other, and hence, switching performance can be enhanced.

Additionally, because the magnetic shunt body 16 is assembled to the moving member 13 and moves around the moving member 13, an entirety of the switch device can be made compact in the moving direction of the moving member 13, as compared with a case where the magnetic shunt body 16 is positioned at the side of the yokes 3, 4 rather than at the side of the moving member 13.

It is to be noted that the invention is not limited to the embodiment which has been described above and shown in the drawings. Particularly, the magnetic shunt body which has moved following the movement of the moving member need not come into contact with the yokes, but may only come near the yokes sufficiently. In short, it would be sufficient that a distance between the magnetic shunt body and the yokes may be varied. Further, relation between the stationary contact and the movable contact may be modified in such a manner that the movable contact is separated from the stationary contact prior to the pressing operation of the brake pedal of the vehicle, and the movable contact is brought into contact with the stationary contact according to the pressing operation of the brake pedal of the vehicle.

Still further, the movable contact need not be composed of two members, namely, a contact main plate formed of the electrically conductive spring material (nonmagnetic material) and a magnetic plate formed of the magnetic material, but may be formed of a single member formed of the electrically conductive spring material having the magnetic property. Particularly in this case, there is such an advantage that the number of components to be used can be reduced.

Additionally, the invention can be generally applied to other switch devices than the stop lamp switch for the vehicle which have substantially the same problems. The invention can be also modified within a range not deviating from the gist of the invention.

What is claimed is:

1. A switch device comprising:

a stationary contact;

a movable contact corresponding to the stationary contact and having magnetic property;

a sealing case which contains the stationary contact and the movable contact;

a yoke corresponding to the movable contact and having magnetic property;

a magnet which exerts a magnetic force on the yoke to attract the movable contact through the yoke;

a moving member positioned outside the sealing case and adapted to be operated to move;

a magnetic shunt body which is assembled to the moving member so as to move in a moving direction of the moving member;

a first spring which urges the magnetic shunt body in the moving direction toward the yoke;

a holder for retaining the magnetic shunt body against an urging force of the first spring; and a second spring which urges the holder and the moving member in a direction away from the yoke with a stronger urging force than that of the first spring, wherein when the moving member is moved against the urging force of the second spring, a distance between the magnetic shunt body and the yoke is changed and the force for attracting the movable contact by the magnet through the yoke is changed, so that the movable contact is moved with respect to the stationary contact.

2. The switch device according to claim 1, where in the movable contact is formed of a single member of electrically conductive spring material having magnetic property.

* * * * *